UNITED STATES PATENT OFFICE.

THE AMERICAN METAL COMPANY, OF WEST MERIDEN, CONNECTICUT, ASSIGNEES, BY MESNE ASSIGNMENTS, OF ELLIOT SAVAGE.

IMPROVEMENT IN PLATING, TEMPERING, AND HARDENING IRON AND STEEL.

Specification forming part of Letters Patent No. 51,754, dated December 26, 1865; Reissue No. 2,308, dated July 10, 1866.

*To all whom it may concern:*

Be it known that I, ELLIOT SAVAGE, of West Meriden, New Haven county, Connecticut, have invented certain new and useful improvements in plating upon iron and steel and in treating iron and steel for hardening and tempering them, and for other purposes; and I do hereby declare that the following is a full, clear, and exact description of the same.

Such invention is an improved method of obtaining the first film or deposit upon the surface of the iron or steel of the metal desired, as silver, copper, gold, &c., and an improved method of heating iron and steel, and of preserving them from oxidation.

Hitherto, in plating upon iron or steel it has been found necessary to polish the surface of the iron or steel, then to wash it well with alkalies in order to remove all traces of grease or oil, and finally finish with a brush, carefully avoiding even the touch of the fingers upon the polished surface. This is then properly introduced into a galvanic bath having a powerful battery. In a short time it can be taken out, there being then a film of metal deposited upon it. If, however, the cleaning was not perfect there will be spots or discolorations upon the deposit, and these are apt to appear on the finished article after it has received the thicker plating in the subsequent weak battery. Sometimes, too, the plating can be readily peeled off.

The following is a description of the manner of carrying out my improvement as applied to the plating of steel with silver: The surface of the steel is first polished, but care is not required to remove the grease or to avoid touching the polished surface with the fingers. A crucible or other suitable vessel is then made ready, adapted to the size of the steel and containing melted cyanide of potassium of the temperature of say 500° or 600° Fahrenheit. The steel is then to be plunged into this and allowed to remain until it has acquired the temperature of the bath. It is then, while hot, removed to a bath containing a nearly saturated solution of cyanide of potassium in water, to which is added a salt of silver —as the chloride of silver—sufficient to make a strength of about 10° Baumé. The steel may be removed from this latter bath as soon as it is cool, and will be found to be perfectly coated with a film of silver without spots or discolorations. The further deposit of silver is to be effected in the ordinary manner.

In the aforesaid process the steel, when taken from the bath of melted cyanide, will have enough of that substance adhering to it to preserve it from the action of the oxygen of the atmosphere while being removed to the cooling bath. While it is in that bath the adhering portion of the melted cyanide will be dissolved off by the solution, and, as the steel is hot, the first particles of silver deposited penetrate the pores of the steel, forming at the surface an actual alloy, and hence the plating will not peel off.

If it is desired to harden the steel as well as to plate it, this will be effected by raising the temperature of the melted cyanide before the steel is plunged into it to the desired point. A temperature of, say, 800° Fahrenheit, will give a great degree of hardness when the steel is afterward plunged into the cooling-bath above described.

It will be obvious that other metals may also be plated upon steel or iron, it being only necessary to substitute for the salt of silver in the cooling-bath a salt of the metal to be deposited.

The haloid salts of the metals are preferable for the cooling-bath, as those contain no acids; but the oxy-salts may be employed if the acid be neutralized.

What I claim as my invention in plating upon iron and steel, and in treating iron and steel for hardening and tempering them, and for other purposes is—

1. Heating the metal by immersing it in a bath of melted cyanide of potassium, substantially as described.

2. Cooling the metal by immersing it in a cooling-liquid, substantially as described, after it has been heated in a bath of melted cyanide of potassium, substantially as described.

ELLIOT SAVAGE.

Witnesses:

JOSEPH J. WOOLLEY,

W. R. BOOTH.